US011042578B2

(12) United States Patent
Liu et al.

(10) Patent No.: US 11,042,578 B2
(45) Date of Patent: Jun. 22, 2021

(54) MULTIGRAM INDEX FOR DATABASE QUERY

(71) Applicant: International Business Machines Corporation, Armonk, NY (US)

(72) Inventors: Xin Peng Liu, Beijing (CN); Peng Hui Jiang, Beijing (CN); Jing Wang, Beijing (CN); ShengYan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/242,217

(22) Filed: Jan. 8, 2019

(65) Prior Publication Data

US 2020/0218748 A1 Jul. 9, 2020

(51) Int. Cl.
*G06F 17/00* (2019.01)
*G06F 16/33* (2019.01)
*G06F 16/901* (2019.01)
*G06F 16/2453* (2019.01)

(52) U.S. Cl.
CPC .... *G06F 16/3335* (2019.01); *G06F 16/24532* (2019.01); *G06F 16/3349* (2019.01); *G06F 16/901* (2019.01)

(58) Field of Classification Search
CPC ............. G06F 16/3335; G06F 16/3349; G06F 16/901; G06F 16/24532; G06F 16/30; G06F 16/93; G06F 16/951
See application file for complete search history.

(56) References Cited

U.S. PATENT DOCUMENTS

| | | | | |
|---|---|---|---|---|
| 6,754,650 | B2* | 6/2004 | Cho | G06F 16/951 |
| 8,266,135 | B2* | 9/2012 | Chen | G06F 16/31 |
| | | | | 707/711 |
| 8,554,698 | B2* | 10/2013 | Bando | G06F 16/90344 |
| | | | | 706/12 |
| 9,218,372 | B2* | 12/2015 | Shami | G06F 16/215 |
| 2012/0005184 | A1* | 1/2012 | Thilagar | G06F 16/90335 |
| | | | | 707/706 |
| 2015/0134676 | A1 | 5/2015 | Abuelsaad et al. | |
| 2016/0124857 | A1 | 5/2016 | Parr | |
| 2016/0321289 | A1* | 11/2016 | Zak | G06F 16/90344 |
| 2017/0116274 | A1 | 4/2017 | Weissman et al. | |
| 2017/0371926 | A1 | 12/2017 | Shiran et al. | |

OTHER PUBLICATIONS

Junghoo Cho and S. Rajagopalan, "A fast regular expression indexing engine," Proceedings 18th International Conference on Data Engineering, San Jose, CA, USA, 2002, pp. 419-430, doi: 10.1109/ICDE.2002.994755, Aug. 2002.*
Weth et al., IEEE Internet Computing, "Multiterm Keyword Search in NoSQL Systems", Copyright 2012 IEEE, pp. 34-42.
J. Boehm et al., "NOSQL for Storage and Retrieval of Large Lidar Data Collections", ISPRS Geospatial Week 2015, La Grande Motte, France, 6 pages.

* cited by examiner

*Primary Examiner* — Greta L Robinson
(74) *Attorney, Agent, or Firm* — William H. Hartwell; Maxine L. Barasch; Keohane & D'Alessandro, PLLC

(57) ABSTRACT

Disclosed embodiments provide techniques for database query utilizing a multigram index. In embodiments, a search query is divided into multiple regex subcomponents. Regex subcomponent indexes are created and searched in parallel, and/or in a sequential manner on reduced data sets, increasing search performance, especially for NoSQL databases.

14 Claims, 7 Drawing Sheets

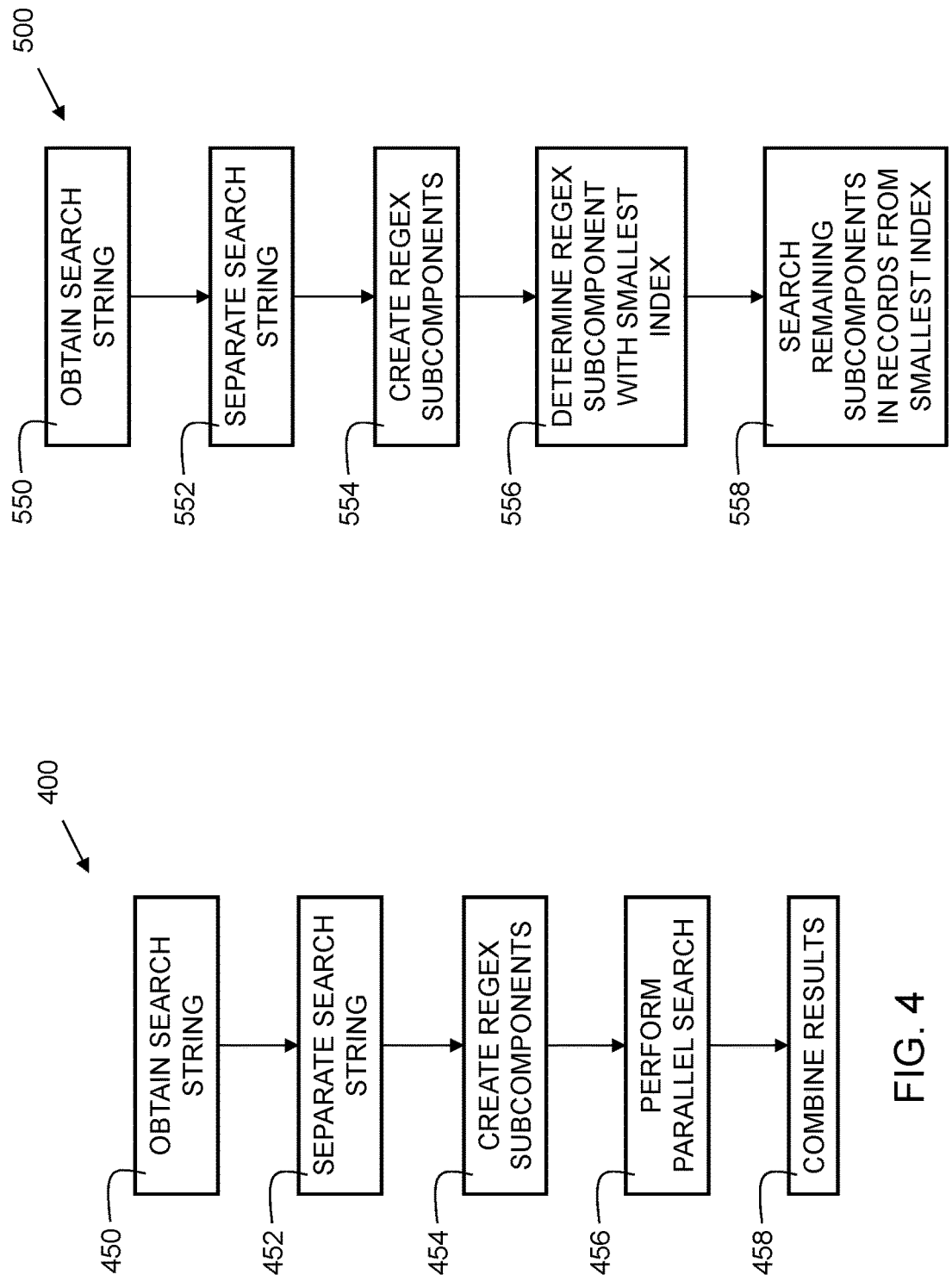

MULTIGRAM INDEX FOR DATABASE QUERY

FIELD

The present invention relates generally to databases, and more particularly, to use of a multigram index for a database search query.

BACKGROUND

The amount of digital data is constantly increasing. The term "Big Data" describes the large volume of data that businesses and other institutions continuously generate. This data can be structured or unstructured. For unstructured data, NoSQL databases are useful for organizing such data, while also providing flexibility for accommodating dynamic schema. The ability to analyze, and thus make use of, Big Data, depends on the ability to efficiently search through large data sets.

SUMMARY

In one embodiment, there is provided a computer-implemented method, comprising: obtaining an index request for a database; separating the index request into a regex component and a non-regex component; separating the regex component into a plurality of regex subcomponents; and creating a regex subcomponent index for each of the plurality of regex subcomponents.

In another embodiment, there is provided an electronic communication device comprising: a processor; a memory coupled to the processor, the memory containing instructions, that when executed by the processor, perform: obtaining an index request for a database; separating the index request into a regex component and a non-regex component; separating the regex component into a plurality of regex subcomponents; and creating a regex subcomponent index for each of the plurality of regex subcomponents.

In yet another embodiment, there is provided a computer program product for an electronic communication device comprising a computer readable storage medium having program instructions embodied therewith, the program instructions executable by a processor to cause the electronic communication device to perform: obtaining an index request for a database; separating the index request into a regex component and a non-regex component; separating the regex component into a plurality of regex subcomponents; and creating a regex subcomponent index for each of the plurality of regex subcomponents.

BRIEF DESCRIPTION OF THE DRAWINGS

Features of the disclosed embodiments will be more readily understood from the following detailed description of the various aspects of the invention taken in conjunction with the accompanying drawings.

FIG. 4 is a flowchart indicating process steps for an embodiment of the present invention.

FIG. 5 is a flowchart indicating process steps for another embodiment of the present invention.

Figure 1:
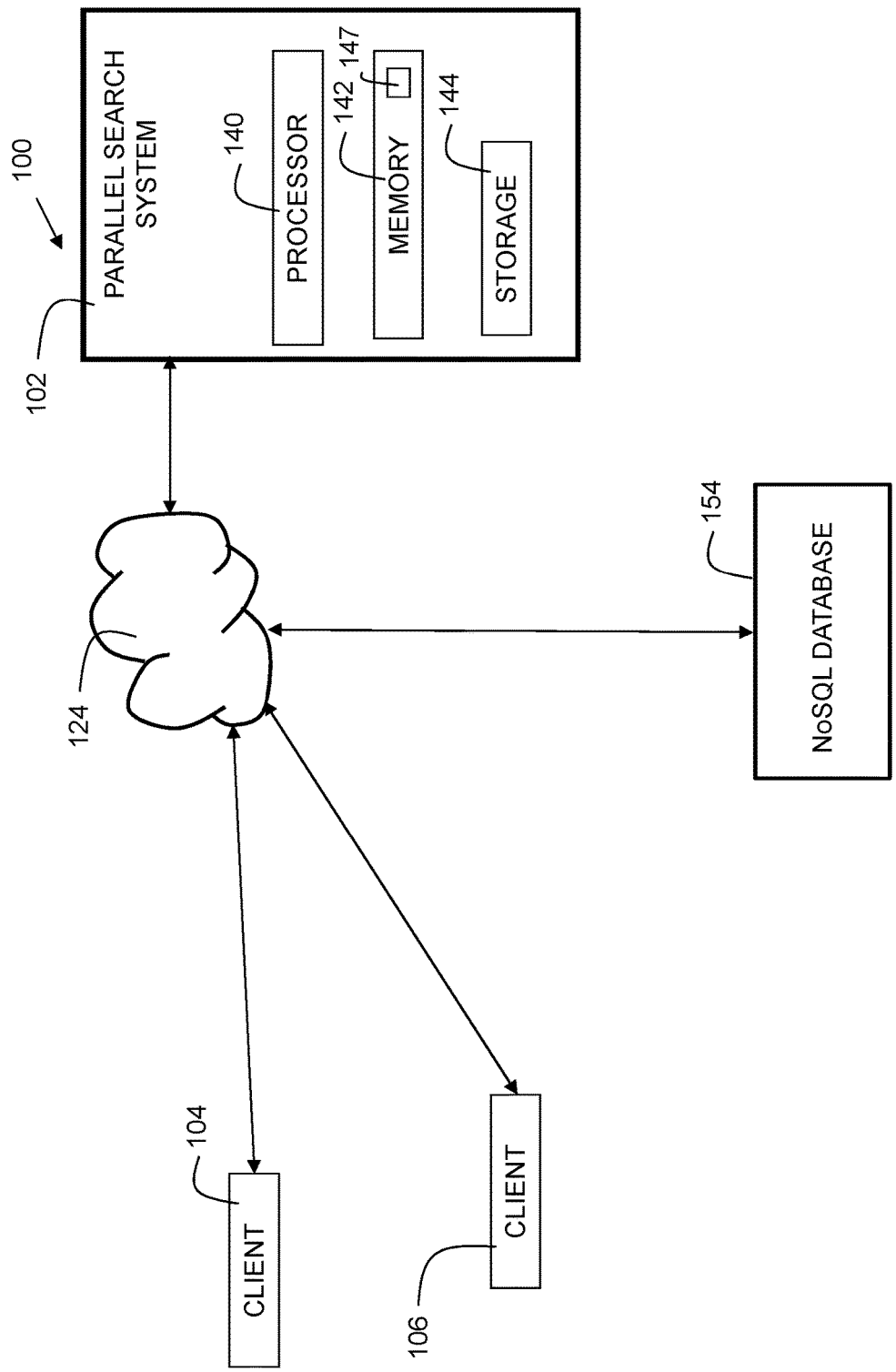
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for database query utilizing a multigram index. In embodiments, a search query is divided into multiple regex subcomponents. Regex subcomponent indexes are created and searched in parallel, and/or in a sequential manner on reduced data sets, increasing search performance, especially for NoSQL databases.

A regular expression, or regex, is, in theoretical computer science and formal language theory, a sequence of characters that define a search pattern. Typically, the pattern is then utilized by string searching algorithms for "find" or "find and replace" operations on strings, or for input validation. This is one example, and other contexts exist as well.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is an environment 100 for embodiments of the present invention. Parallel search system 102 comprises a processor 140, a memory 142 coupled to the processor 140, and storage 144. The memory 142, contains instructions 147, that when executed by the processor 140, perform embodiments of the present invention. Memory 142 may include dynamic random access memory (DRAM), static random access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs).

System 102 is connected to network 124, which is the Internet, a wide area network, a local area network, or other suitable network. System 102 is an electronic communication device. Client devices 104 and 106 are also connected to network 124. Client devices are smartphones, tablets, laptop computers, desktop computers, or other electronic computing device. Although two client devices are shown in the example, more or fewer may be included in implementations.

Search database 154 is connected to network 124. In the example, the database 154 is a NoSQL database. NoSQL refers to a database that is not based on SQL (Structured Query Language). NoSQL databases typically do not have schema, and they have looser consistency models than traditional relational databases. NoSQL has become a popular choice in certain applications where traditional relational databases are not suitable, such as applications involving Big Data (large volumes of data). The meaning of the term has also been extended to "Not only SQL", indicating support for potential SQL-based interfaces even if the core database isn't relational.

Parallel search system 102 may utilize natural language processing techniques to tokenize inputs, perform entity detection, disambiguation, parts-of-speech identification, and/or other techniques to separate a search query into multiple subcomponents and generate regex expressions for one or more of the multiple subcomponents.

Figure 2:
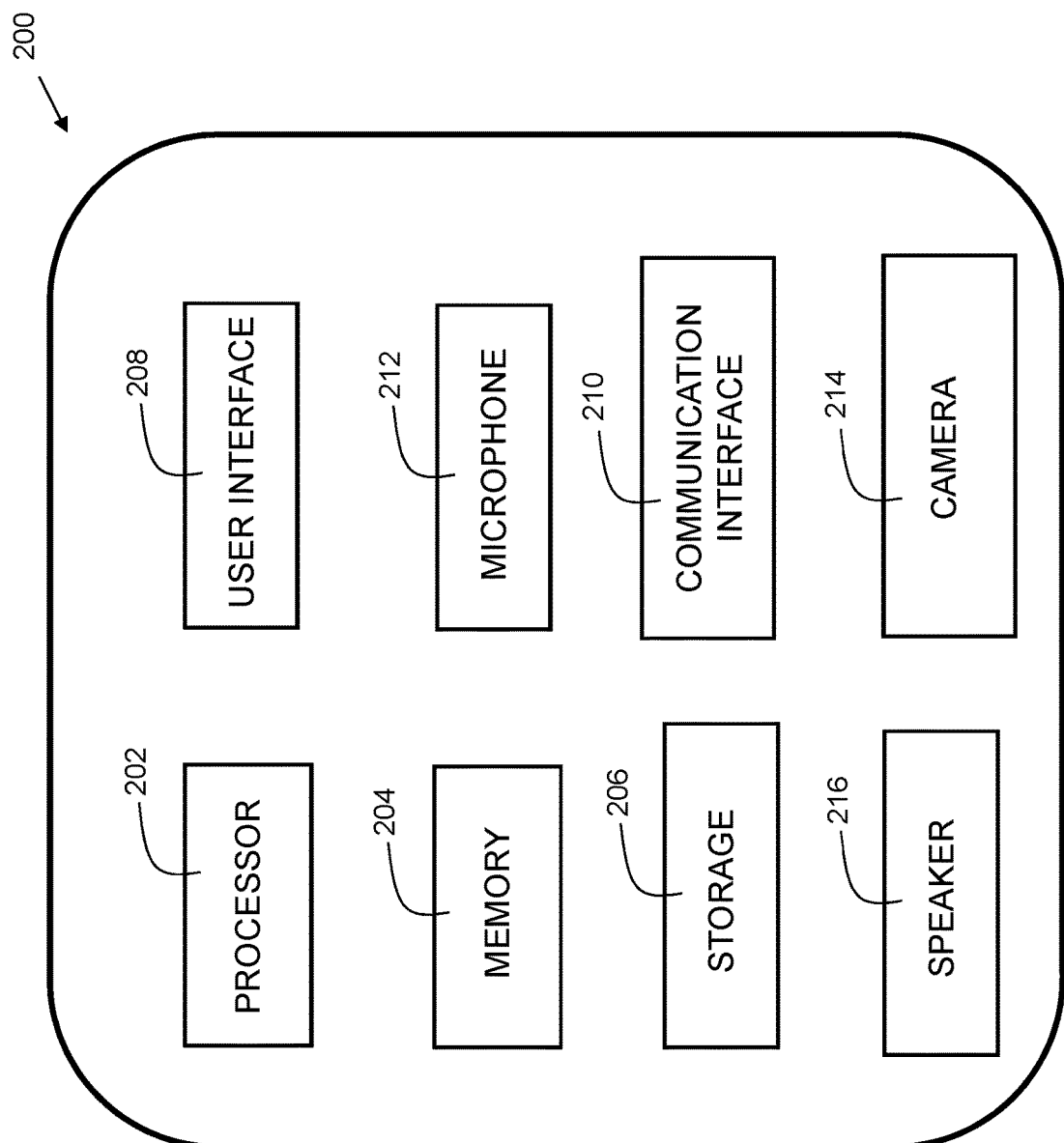
FIG. 2 is a block diagram of a client device used with embodiments of the present invention.

FIG. 2 is a block diagram of a client device 200 used with embodiments of the present invention. Device 200 is an electronic communication device, which can be a computer, mobile device, wearable device, etc. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. In embodiments, device 200 may have multiple processors 202, and/or multiple cores per processor. The device 200 may execute an operating system that provides virtual memory management for the device 200. The processor 202 may have one or more cache memories therein. Memory 204 stores instructions, which when executed by the processor, implement embodiments of the present invention.

Device 200 further includes storage 206. In embodiments, storage 206 may include one or more magnetic storage devices such as hard disk drives (HDDs). Storage 206 may additionally include one or more solid state drives (SSDs).

Device 200 further includes a user interface 208, examples of which include a liquid crystal display (LCD), a plasma display, a cathode ray tube (CRT) display, a light emitting diode (LED) display, an organic LED (OLED) display, or other suitable display technology. The user interface 208 may further include a keyboard, mouse, or other suitable human interface device. In some embodiments, user interface 208 may be a touch screen, incorporating a capacitive or resistive touch screen in some embodiments.

Device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth®, Wi-Fi, and/or cellular communication protocols for communication over a computer network.

Device 200 further includes a microphone 212, speaker 216, and camera 214. Speaker 216 may be powered or passive. Camera 214 may have a flash.

Figure 3:
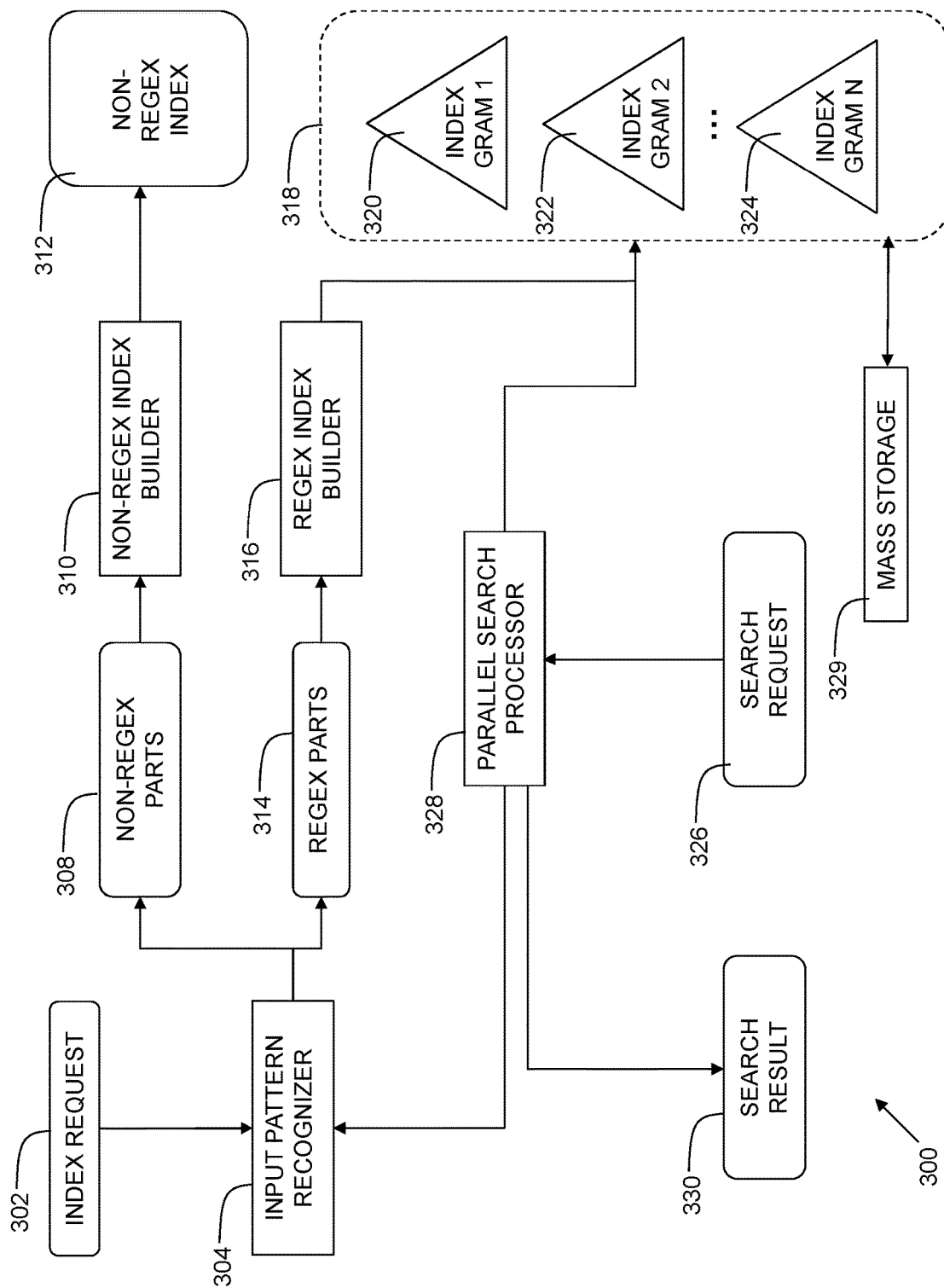
FIG. 3 is a system architecture diagram for an embodiment of the present invention.

FIG. 3 is a system architecture diagram 300 for an embodiment of the present invention. In the diagram, a rectangle box represents a logical component. A rounded box represents artifacts (input/output data to/from components).

Note that the phrases "regular expressions," and "regexes," refer to the specific, standard textual syntax for representing patterns for matching text. Each character in a regex (that is, each character in the string describing its pattern) is either a metacharacter having a special meaning, or a regular character having a literal meaning. The following are examples of regex commands:

| | |
|---|---|
| \A | Start of string |
| a{X} | Exactly X of a |
| \d | one digit from 0 to 9 |
| \D | One character that is not a digit |
| \s | "whitespace character" |

This list is exemplary, and many more regex commands exist.

At 302, an index request is received. At 304, input from the index request is received at the input pattern recognizer. The input pattern recognizer splits the index request into regex parts at 314, and non-regex parts at 308. In some cases, an index request may contain only regex parts, only non-regex parts, or both regex and non-regex parts. The non-regex parts are input to a non-regex builder at 310, which outputs a non-regex index at 312. The regex parts 314 are input to a regex index builder 316, which outputs data to a multigram cache at 318. The multigram cache 318 stores indexes from multiple subcomponents (referred to as "grams") in local memory for fast access.

For each regex part (gram), an index is built. As an example, there are three gram indexes as shown within the multigram cache at 318. If the indexes 320, 322, and 324 are frequently used for searches, they remain in the multigram cache at 318. If they are not frequently used, they may be moved to mass storage 329. Mass storage 329 may include magnetic storage such as a hard disk drive, or can include a solid-state disk drive. The multigram cache may include random access memory offering fast access times for improved performance.

At 326, a search request is received. At 328, input from the search request is received at the parallel search processor. The parallel search processor 328 can split up the regex parts into multiple regex subcomponents (referred to as "grams"). An index for each gram can be generated in parallel. The search results are then provided at 330. In embodiments, the parallel search processor 328 takes the Boolean AND result of the indexes, returning a list of records present in each gram index associated with the search request. In this way, the efficiency of the search is improved, since each regex subcomponent index is created/searched in parallel.

Accordingly, embodiments include obtaining an index request for a database. Embodiments separate the index request into a regex component and a non-regex component. The regex component is separated into a plurality of regex subcomponents. A regex subcomponent index is created for each of the plurality of regex subcomponents.

Some embodiments further include building a non-regex component index. In embodiments, creating the regex subcomponent index for each of the plurality of regex subcomponents comprises creating the regex subcomponent index in a NoSQL database.

Indexes can be "prebuilt" based on commonly used terms, or terms expected to be used. As an example, indexes can be built based on common names, places, and/or other commonly searched things.

FIG. 4 is a flowchart 400 indicating process steps for an embodiment of the present invention. At 450, a search string is obtained. This can include one or more regular expression (regex) components. For example, the search string: /^[a-z0-9_-]{6,18}$/ can be used to search for a string including letters, numbers, underscores, or hyphens, having a length of 6 to 18 characters, such as may be the criteria for a username or password. At 452, the search string is separated into a regex component and a non-regex component. The non-regex component may include natural language strings. Some search strings may not have a regex component. Some search strings may not have a non-regex component. Some search strings may have both a regex and a non-regex component. At 454, regex subcomponents are created. Using the previous example, one regex subcomponent may be /^[a-z0-9_-] and another regex subcomponent may be {6,18}. At 456, a parallel search is performed, searching each regex subcomponent in parallel. At 458, results for each regex subcomponent are combined, to enable returning database records that are present in each regex subcomponent index.

FIG. 5 is a flowchart 500 indicating process steps for another embodiment of the present invention. In this embodiment, the search is performed in a cascading manner, instead of using a purely parallel approach. At 550, a search string is obtained. At 552, the search string is separated. At 554, regex subcomponents are created. At 556, the regex subcomponent with the smallest index is determined. At 558, a search is performed of the remaining subcomponents in records from the smallest index. As an example, the regex /^#?[a-f0-9]{6}$/ may be used to search for a hexadecimal code starting with a "#" character, and then including exactly six characters that include only numbers 0-9 and letters 'a' through 'f.' The regex may be divided into three subcomponents: "#", [a-f0-9], and {6}. If one of the subcomponent indexes is much smaller than the others, then the remaining regexes can be searched against the subset of results of the smallest subcomponent index. Continuing with the example, if in a NoSQL database, there are 500,000 records of strings starting with "#" and 200,000 records that include strings that include only numbers 0-9 and letters 'a' through 'f,' and 500 records that are exactly six characters long, then by creating the gram index for {6}, and using that index as the starting point for searching for strings starting with "#" and also contain exactly six characters that include only numbers 0-9 and letters 'a' through 'f,' the search efficiency is greatly improved, since far fewer records need to be searched.

In some embodiments, it is not known as a priori if one index is considerably smaller than others. In such cases, each regex subcomponent may be searched in parallel throughout the entire NoSQL database to start. Once the first regex subcomponent search completes, the remaining searches are aborted and restarted, searching only through the records included in the first search. This cascaded approach can offer considerable time savings when one regex subcomponent index is considerably smaller than other regex subcomponent indexes.

Figure 6:
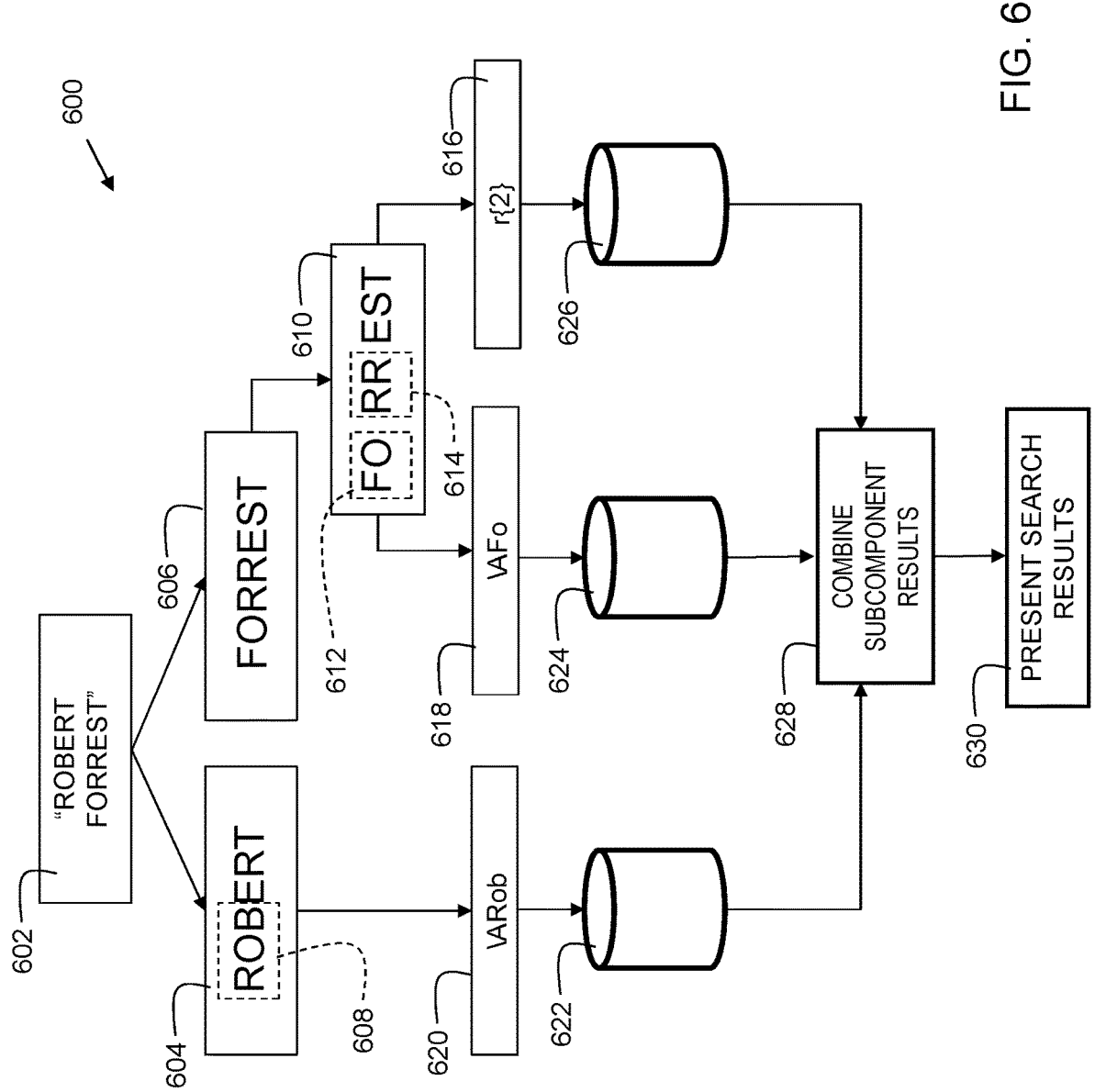
FIG. 6 shows a search example using embodiments of the present invention.

FIG. 6 shows a search example 600 using embodiments of the present invention. At 602, there is shown an example search query—the name "ROBERT FORREST". In embodiments, a suitable regex may be computer-generated based on a natural language search string. In this example, the natural language search string of the name "Robert Forrest" is converted into a regular expression with multiple regex subcomponents. At 604 and 606, the search string is tokenized into tokens ROBERT and FORREST, respectively. Subtokens are generated at 604 including "ROB" 608. Subtokens are also generated at 610, into "FO" 612 and "RR" 614. At 620, 618, and 616, regex subcomponents are formed. At 620, there is "\ARob", which identifies strings that start with "Rob" as from subtoken 608. At 618, there is "\AFo", which identifies strings that start with "Fo" as from subtoken 612. At 616, there is "r{2}", which identifies strings that includes the pattern "rr" as from subtoken 614. Searching of respective indexes 622, 624, and 626 is then performed. At 628, the results are combined, identifying database records that are present in all three indexes. At 630, the search results are presented including records that are found in all three indexes.

In embodiments, separating the regex component into a plurality of regex subcomponents comprises forming regex subcomponents including at least one of: digit, non-digit, ASCII character, Unicode character, or white space character.

Figure 7:
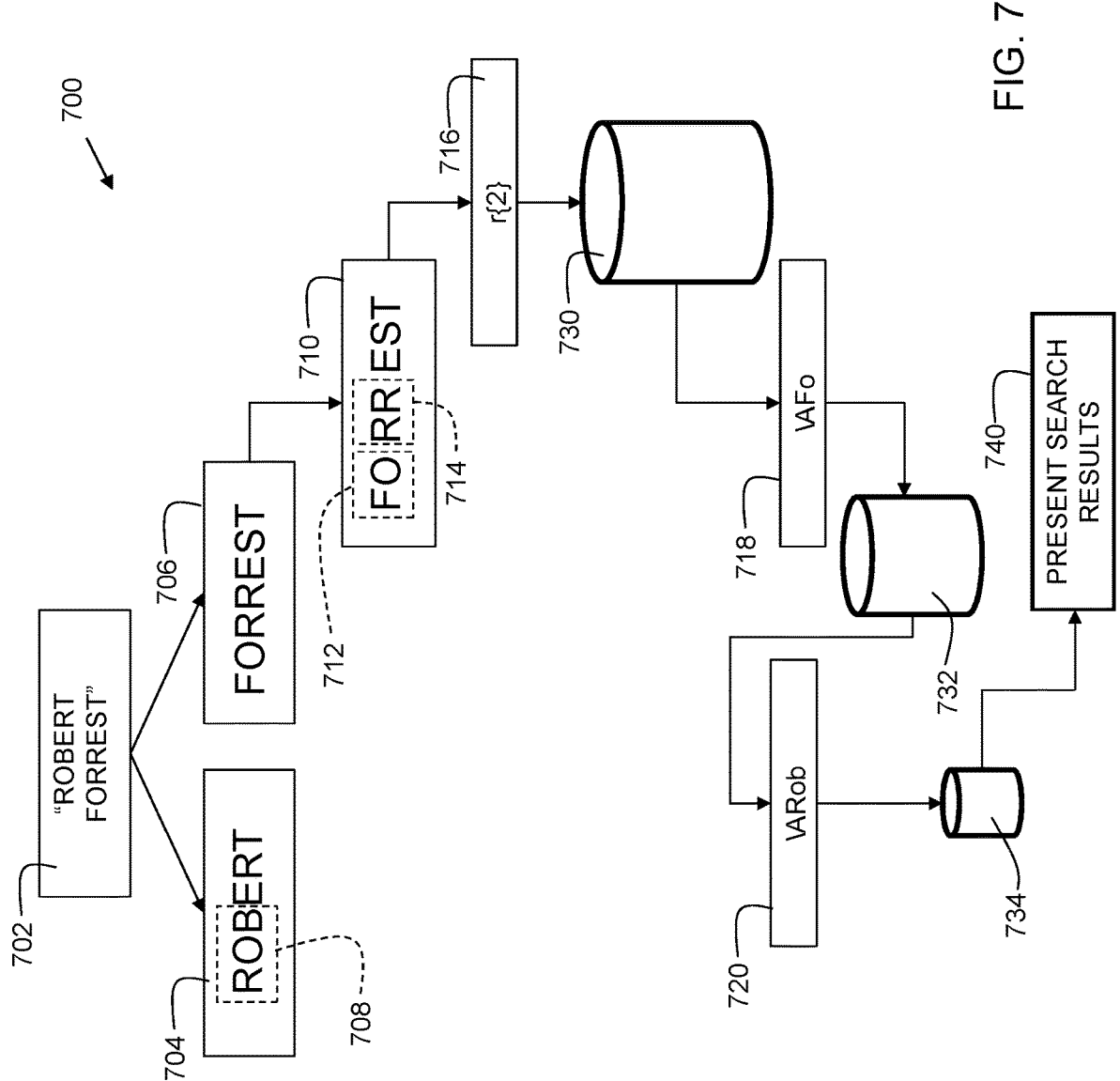
FIG. 7 shows another search example using embodiments of the present invention.

FIG. 7 shows another search example using embodiments of the present invention. At 702, there is shown an example search query—the name, "ROBERT FORREST". At 704 and 706, the search string is tokenized into tokens ROBERT and FORREST, respectively. Subtokens are generated at 704 including "ROB" 708. Subtokens are also generated at 710, into "FO" 712 and "RR" 714. At 720, 718, and 716, regex subcomponents are formed. At 716, there is "r{2}", which identifies strings that includes the pattern "rr" as from subtoken 714. A search is performed on such at 730. At 718, there is "\AFo", which identifies strings that start with "Fo" as from subtoken 712. A search is performed on such at 732. This search completes fairly quickly, since it is just searching on the subset of database results returned from the previous search. At 720, there is "\ARob", which identifies strings that start with "Rob" as from subtoken 708. A search is performed on such at 734. This search completes quickly, since it is just searching on the subset of database results returned from the previous search. The search results are then presented at 740.

The embodiment of FIG. 7 is similar to that of FIG. 6, except that in this case, the search based on regex subcomponent 716 provides a small result set, and so the remaining regex subcomponents 718 and 720 can be sequentially searched using the reduced result set. In this example, regex subcomponent 718 is searched through a smaller result set 732, and then regex subcomponent 720 is searched using an even smaller result set 734. Thus, each stage narrows down in a cascading manner, reducing the amount of information that needs to be searched, reducing search time and increasing performance. Thus, when receiving a new search request, embodiments determine which part is matched first, rather than using a predefined order such as from left to right, or from right to left. This approach can enable a significant reduction in the scope of the data set that needs to be searched, thereby improving performance. In embodiments, the first result set may include a number of entries that is less than 10 percent of the total number of records in the database.

Figure 8:
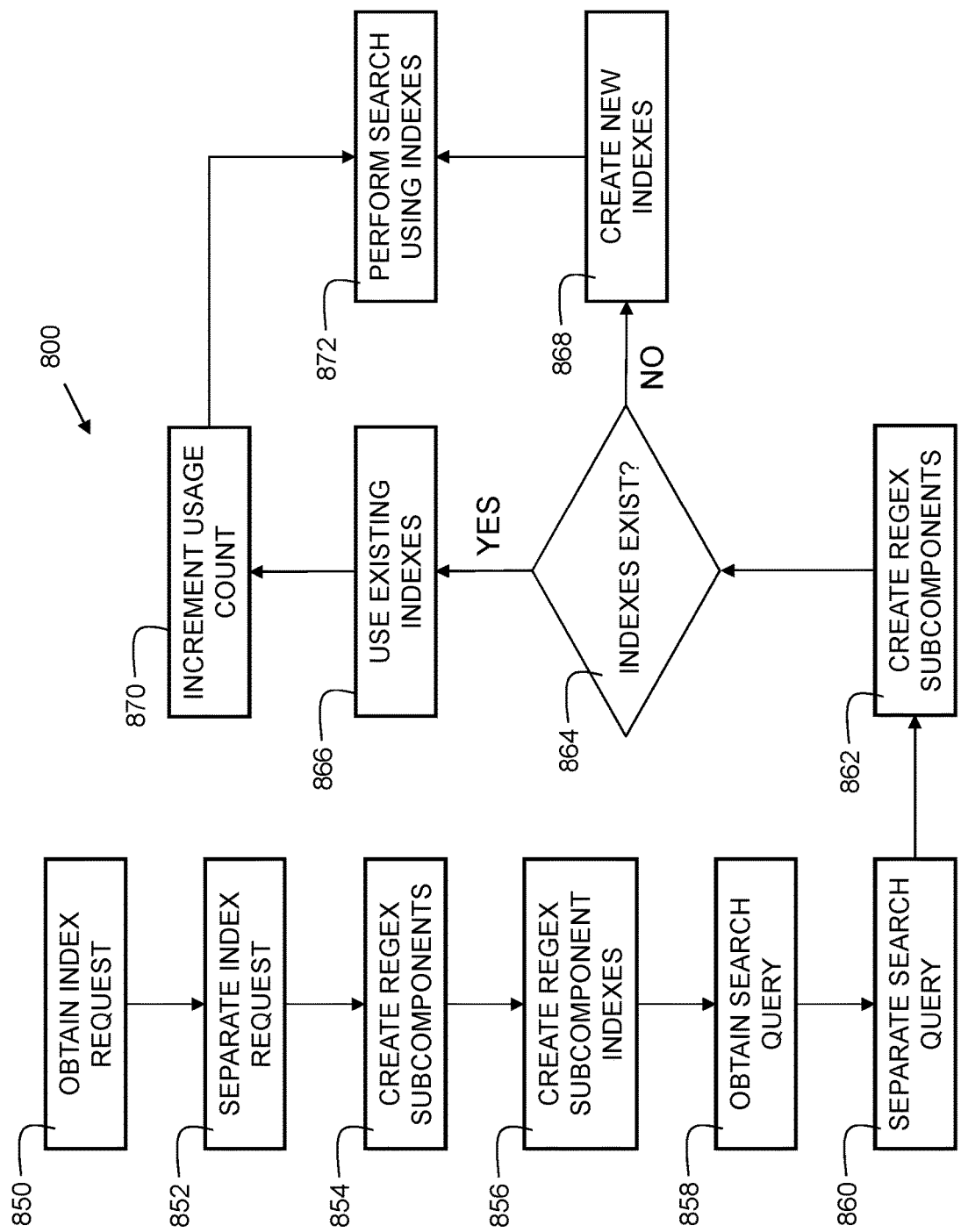
FIG. 8 is a flowchart indicating additional process steps for embodiments of the present invention.

FIG. 8 is a flowchart indicating additional process steps for embodiments of the present invention. At 850, an index request is obtained. At 852, the index request is separated. At 854, regex subcomponents are created. At 856, regex subcomponent indexes are created. At 858, a search query is obtained. At 860, the search query is separated. At 862, regex subcomponents are created. At 864, it is determined whether indexes exist.

If at 864, the determination is yes, the process proceeds to 866 where the existing indexes are used. Then, at 870, the usage count is incremented. The usage count can be a criterion for determining if indexes are to be stored in cache, and/or mass storage. The usage count can be incremented every time an index is used for a search. If the usage count is high, leaving the index in cache can result in increased performance. If the usage count is low, then the index is not frequently used, and can be removed from the cache to make room for other indexes to be stored there. In embodiments, a high usage count is a count that exceeds a predetermined threshold. In embodiments, the predetermined threshold is a value ranging between 10 and 100. Thus, embodiments include caching one or more identified previously created (i.e., "existing") subcomponent indexes in response to the usage count exceeding a predetermined value. In some embodiments, over time, the usage counts automatically decrement. Thus, with no new search activity, eventually indexes that are no longer used get low usage counts, and accordingly get removed from the cache. At 872, a search is performed using the indexes. If at 864, the determination is no, the process proceeds to 868, where new indexes are created. At 872, a search is performed using the indexes.

Embodiments can include obtaining a search query for the database; separating the search query into a regex component and a non-regex component; separating the regex component into a plurality of regex subcomponents; identifying previously created subcomponent indexes that match one or more of the plurality of regex subcomponents; and performing a search of the identified previously created subcomponent indexes. Embodiments can further include creating a regex subcomponent index for each regex subcomponent from the plurality of regex subcomponents that is absent from the previously created subcomponent indexes. Embodiments can further include incrementing a usage count for each of the identified previously created subcomponent indexes.

As can now be appreciated, disclosed embodiments provide improved search results for unstructured databases such as NoSQL databases. Search performance can be improved using a fine granularity of indexing by creating various indexes for regex subcomponents. Additionally, search performance can be improved by executing a search query in parallel. Search performance is further improved by utilizing previous search history as a basis to cache frequently used indexes. Embodiments include creation of additional indexes as a sub-stage of a main regex index. Each sub-stage index is derived from a regex subcomponent. This enables a quick match early in the search process to reduce the index search range, thereby increasing database performance.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method, comprising:
   obtaining an index request for a NoSQL database;
   separating the index request into a regex component and a non-regex component;
   separating the regex component into a plurality of regex subcomponents;
   creating a regex subcomponent index for each of the plurality of regex subcomponents;
   building a non-regex component index;
   obtaining a search query for the NoSQL database using a parallel search;
   separating the search query into a regex component and a non-regex component;
   separating the regex component into a plurality of regex subcomponents using an input pattern recognizer;
   identifying previously created subcomponent indexes that match one or more of the plurality of regex subcomponents; and
   performing a search of the identified previously created subcomponent indexes.

2. The computer-implemented method of claim 1, further comprising:
   creating a regex subcomponent index for each regex subcomponent from the plurality of regex subcomponents that is absent from the previously created subcomponent indexes.

3. The computer-implemented method of claim 1, further comprising, incrementing a usage count for each of the identified previously created subcomponent indexes.

4. The computer-implemented method of claim 3, further comprising, caching one or more identified previously created subcomponent indexes in response to the usage count exceeding a predetermined value.

5. The computer-implemented method of claim 1, wherein separating the regex component into a plurality of regex subcomponents comprises forming regex subcomponents including at least one of: digit, non-digit, ASCII character, Unicode character, and white space character.

6. The computer-implemented method of claim 1, wherein creating the regex subcomponent index for each of the plurality of regex subcomponents comprises creating the regex subcomponent index in the NoSQL database.

7. An electronic communication device comprising:
   a processor;
   a memory coupled to the processor, the memory containing instructions, that when executed by the processor:
   obtain an index request for a NoSQL database;
   separate the index request into a regex component and a non-regex component;
   separate the regex component into a plurality of regex subcomponents;
   create a regex subcomponent index for each of the plurality of regex subcomponents;
   build a non-regex component index;
   obtain a search query for the NoSQL database using a parallel search;
   separate the search query into a regex component and a non-regex component;
   separate the regex component into a plurality of regex subcomponents using an input pattern recognizer;
   identify previously created subcomponent indexes that match one or more of the plurality of regex subcomponents; and
   perform a search of the identified previously created subcomponent indexes.

8. The electronic communication device of claim 7, wherein the memory further comprises instructions, that when executed by the processor, create a regex subcomponent index for each regex subcomponent from the plurality of regex subcomponents that is absent from the previously created subcomponent indexes.

9. The electronic communication device of claim 7, wherein the memory further comprises instructions, that when executed by the processor, increment a usage count for each of the identified previously created subcomponent indexes.

10. The electronic communication device of claim 9, wherein the memory further comprises instructions, that when executed by the processor, cache one or more identified previously created subcomponent indexes in response to the usage count exceeding a predetermined value.

11. A computer program product for an electronic communication device comprising a computer readable storage medium having program instructions embodied therewith, the program instructions executable by a processor to cause the electronic communication device to:
   obtain an index request for a NoSQL database;
   separate the index request into a regex component and a non-regex component;
   separate the regex component into a plurality of regex subcomponents;
   create a regex subcomponent index for each of the plurality of regex subcomponents;
   build a non-regex component index;
   obtain a search query for the NoSQL database using a parallel search;
   separate the search query into a regex component and a non-regex component;
   separate the regex component into a plurality of regex subcomponents using an input pattern recognizer;
   identify previously created subcomponent indexes that match one or more of the plurality of regex subcomponents; and
   perform a search of the identified previously created subcomponent indexes.

12. The computer program product of claim 11, wherein the computer readable storage medium includes program instructions executable by the processor to cause the electronic communication device to create a regex subcomponent index for each regex subcomponent from the plurality of regex subcomponents that is absent from the previously created subcomponent indexes.

13. The computer program product of claim 11, wherein the computer readable storage medium includes program instructions executable by the processor to cause the electronic communication device to increment a usage count for each of the identified previously created subcomponent indexes.

14. The computer program product of claim 13, wherein the computer readable storage medium includes program instructions executable by the processor to cause the electronic communication device to cache one or more identified previously created subcomponent indexes in response to the usage count exceeding a predetermined value.

* * * * *